Figure 1:
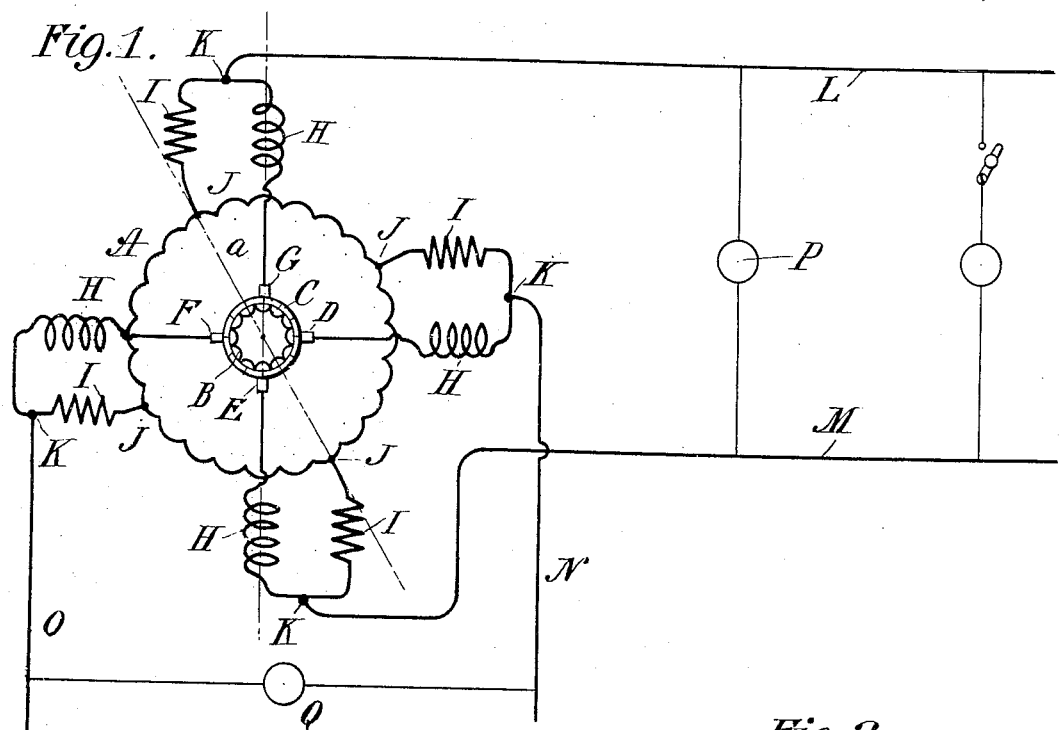

W. STANLEY.
ALTERNATING CURRENT DYNAMO ELECTRIC MACHINE.
APPLICATION FILED MAY 13, 1905. RENEWED MAY 5, 1909.

925,666.

Patented June 22, 1909.

Witnesses

Inventor:
WILLIAM STANLEY
By his Attorneys

UNITED STATES PATENT OFFICE.

WILLIAM STANLEY, OF GREAT BARRINGTON, MASSACHUSETTS, ASSIGNOR TO GENERAL ELECTRIC COMPANY, A CORPORATION OF NEW YORK.

ALTERNATING-CURRENT DYNAMO-ELECTRIC MACHINE.

No. 925,666.  Specification of Letters Patent.  Patented June 22, 1909.

Application filed May 13, 1905, Serial No. 260,248. Renewed May 5, 1909. Serial No. 494,132.

*To all whom it may concern:*

Be it known that I, WILLIAM STANLEY, a citizen of the United States, residing at Great Barrington, county of Berkshire, Massachusetts, have invented certain new and useful Improvements in Alternating-Current Dynamo-Electric Machines, of which the following is a full, clear, and exact description.

My invention relates to dynamo electric machines, and has for its object to produce a new and improved dynamo electric machine which shall automatically compound or compensate so as to have any desired potential gradient. The principle is applicable for such machines whether used as generators or motors. I will, however, describe it from the point of view of a generator. By potential gradient I mean variation of potential with increasing load; thus, a positive potential gradient is present when the potential increases as the load increases, and a negative potential gradient is present when the potential decreases with an increase of load.

I shall describe the invention in connection with the apparatus described and shown in my application, Serial No. 243,842, filed February 2nd, 1905, in which a multiphase stator winding is energized by alternate currents supplied by the machine itself.

The invention of the present application as applied to that machine relates to a method of and means for predetermining and governing the value of the electro-motive forces throughout variations of current delivered to the external circuit and throughout variations of the character or power factor of such current. The phenomena to be described are remarkable for the reason that they seem to be contrary to the results usually obtained under the conditions given; thus, heretofore experience has taught that the addition of resistance to the field circuit of an alternator or of inductance to its armature circuit causes the electro-motive force of the machine to decrease, especially with increase of load. I, however, have discovered a way in which these effects are reversed. Thus, for instance, I have discovered that the insertion of resistance into the field circuit of my machine causes an increase of magnetizing current and magnetization in the machine, and a consequent increase of electro-motive force at its terminals when the current delivered to the line under certain conditions increases. I have also found that the introduction of inductance in the armature circuit will produce a similar increase of magnetizing current, magnetization and electro-motive force at the terminals of the machine when the machine is called upon to deliver an increase of load current to the exterior circuit under other conditions.

The increase of electro-motive force first referred to, namely, when resistance is added to the field circuit takes place when the machine is called upon to deliver an increase of lagging current to the external circuit and the increase of electro-motive force referred to when inductance is introduced into the armature circuit takes place when the machine is called upon to deliver currents of unity power factor. By the introduction, therefore, of resistance and inductance to these two circuits, respectively, in one and the same machine, I am able to produce a machine which will automatically increase its magnetizing current, magnetization and electro-motive force with an increase of load of any power factor, and by suitably proportioning the values of these resistances and inductances and the ratio of one to the other, I am able to construct a machine which will have any predetermined or desired potential gradient, by which I mean any predetermined or desired increase in electro-motive force for any given increase of load of any power factor. The resistance may be external, or may be the resistance of the winding itself. The inductance also may be introduced by external means or may be provided for in designing the windings so as to produce a local field. I have further found that the increase of electro-motive force above referred to may be brought about by superimposing upon the magnetization of the machine an additional magnetization, likewise produced by and depending upon the current delivered to the line, but produced, not in the main energizing winding of that machine itself, but in an additional winding, and that the effect of such superimposed magnetization in increasing or varying the electro-motive force of the machine will be altered by varying the position of the added windings, and consequently the time of magnetization so produced with reference to the original magnetization of the machine, so that it may replace wholly or to any desired extent the effects produced by either the resistance or inductance above referred to. I have shown and described this feature in combination with the resistance and inductance above referred to, and in so far as it has features of operation in common with the features of operation of said resistances and inductances have broadly claimed it herein. I have, however, described and shown it in another application filed herewith, and made its specific features the subject of the claims of that application.

The object of my invention being to vary the magnetization and consequently the electromotive force of the machine in accordance with variations of the currents to be delivered to the external circuit, the broad method as carried out by the use of resistance or inductance, and by the additional windings has the fundamental feature of introducing a compounding or compensating magnetization in accordance with the variations of current delivered to the work circuit, an additional current in the one instance being caused to flow in the magnetizing circuits, thus producing an increased resultant current which produces an increased magnetization, while in the other instance, the additional current is caused to flow in a separate circuit, producing a resultant magnetization of increased value,—the resultants, and hence the total magnetization of the machine in each instance varying in accordance with variations of current delivered to the external circuit.

The following is a description of apparatus embodying my invention, reference being had to the accompanying drawings, in which—

Figure 2:
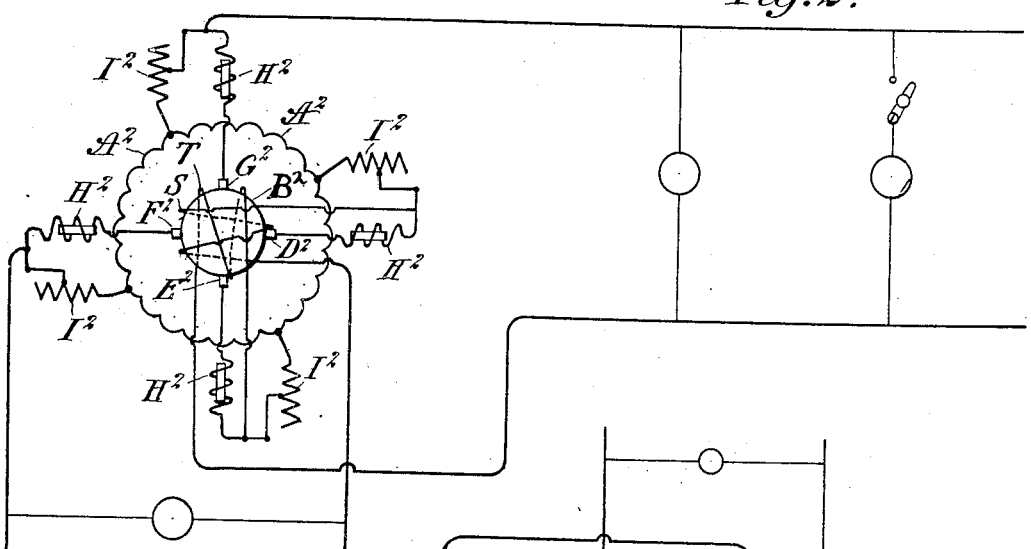
Figure 3:
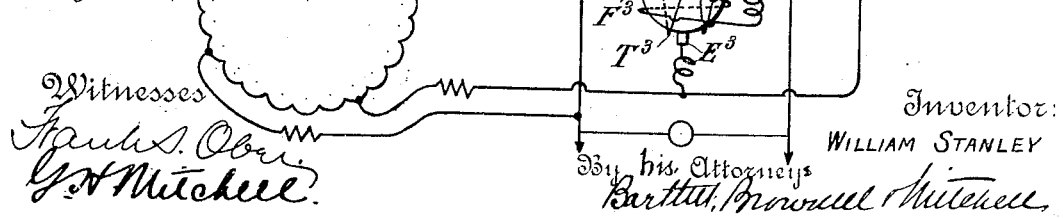

Figure 1 represents diagrammatically a machine embodying my invention as carried out solely by the use of resistances or inductances. Fig. 2 represents diagrammatically an embodiment of my machine in which the invention is carried out both by the use of resistances and inductances, and also by the auxiliary winding above referred to. Fig. 3 represents diagrammatically a machine in which my invention is carried out by means of resistances and inductances and also by means of an additional winding, the circuit connections differing from those shown in Fig. 2 as will be hereinafter pointed out.

My invention permits of various other modifications of which those shown in the three diagrams above referred to are but examples.

Referring more particularly to the drawings, Fig. 1 represents an alternating current dynamo electric machine, self excited by alternating currents, such as described in my application Serial No. 243,842 above referred to. A is the energizing or stator winding. B is the induced or rotor winding. The windings A and B are preferably of the ordinary distributed type. The winding B is connected to a commutator C on which bear brushes D, E, F and G, which are electrically connected through the inductances H and the resistances I to the stator winding at points J. The points J in the diagram shown are displaced relatively to the brushes to which they are connected, so that the field set up by the stator windings shall not coincide with the field set up by the rotor winding. In other words, the stator winding is dissymmetrical with reference to the rotor windings, the polar lines set up by the energizing current flowing through said two windings being always angularly displaced by an angle $a$. At points K between the inductances H and the resistances I the mains L M and N O, supplying respectively the translating devices P and Q are connected.

In an arrangement such as above described, therefore, when the inductances and resistances are omitted, there will be developed by the rotation of the rotor an electro-motive force at the terminals of the rotor circuit which on account of the dissymmetry of the stator winding will not coincide in phase with the electro-motive force induced upon the terminals of the stator winding to which such brushes are connected. This rotor electro-motive force is alternating in character, and of a frequency determined by the speed of the machine, and the number of turns in the rotor and stator circuits in accordance with the laws set out in the application above referred to. The electro-motive force upon the stator circuit taps J connected to the brushes is determined by the rotation of the magnetic flux through the stator circuit, and is of the same frequency as the electro-motive force at the brushes or rotor terminals, and since it differs in phase from the rotor electro-motive forces, currents will flow from one of each pair of brushes through the rotor winding to the other of each pair of brushes, magnetizing the machine. Thus one current will flow through the circuit consisting of the rotor winding B to brush D, right hand coil H and resistance I, stator winding A, left hand resistance I and coil H to brush F. The other current will flow through the circuit consisting of the rotor winding B to brush E, lower coil H and resistance I, stator winding J, upper resistance I, and coil H to brush G. These currents will be of different phase and produce rotating magnetic fields upon both rotor and stator. The value of the current flowing in each of these circuits will increase until its resistance electro-motive force equals the vector difference between the electro-motive forces at the rotor and stator terminals. That is, these currents will each develop within their rotor and stator circuits two additional electro-motive forces proportional to the product of the resistance and the current which will combine with the induced electro-motive forces of the stator and rotor so as to produce resultants which have zero phase displacement and equal terminal values.

The magnetizing current and consequently the magnetization and electro-motive force of the machine is determined by the value of the resistance electro-motive forces that are necessary to bring the resultant electro-motive forces of the rotor and stator to the same phase. When coincidence of phase between the resultant rotor and stator electro-motive forces has been established, the operation of the machine is stable, that is, the equality of the resultant electro-motive forces periodically re-occurs during each alternation, so long as no new and disturbing internal conditions of electro-motive force take place. If, now, the machine is called upon to deliver current to the external circuit (the coils in the inductances and resistances H and I being absent) and if the current to be so delivered, be, for example, power factor zero value, that is, lags 90° behind the terminal electro-motive force of the machine, then evidently such work current will very nearly coincide in phase with the magnetizing current of the rotor, while it will be opposite in phase to the magnetizing current in the stator, and a re-distribution of current in the two rotor and stator circuits will necessarily take place, the rotor current increasing and the stator current decreasing in value. If, for example, the magnetizing current in the rotor and stator is 10 amperes and the number of turns of winding of the stator and rotor are the same, and if the external circuit demands a current of 5 amperes at power factor zero, a re-distribution of the currents will take place, in which the rotor circuit has 15 amperes of current flowing out and the stator has 5 amperes of current flowing in it, the total magnetizing value of the current will evidently be 15 amperes plus 5 amperes or 20 amperes, which will be the same as that found when no current was externally delivered. In like manner, if the machine be called upon to deliver a non-lagging or power factor unity current (and the resistance and leakage of the rotor and stator be considered infinitely small) then the rotor will furnish one half and the stator one half of such power factor unity current to the external circuit, and such flow of power factor unity current will again evidently cause a re-distribution of the current found in the rotor and stator circuits for the reason that in the rotor the power factor unity current combined with the original magnetizing current will produce a resultant current differing in phase from such magnetizing current, and similarly the power factor unity current and magnetizing current in the stator will combine to produce a new resultant current of different phase therein. These two resultant currents in rotor and stator will differ in phase from one another for the reason that the power factor unity current in the stator is in the reverse direction to that in the rotor with reference to the magnetizing currents therein, for the reason that these circuits are connected in parallel with reference to the main line and in series with reference to each other.

When power factor unity currents are being delivered both the rotor and the stator furnish energy currents in the main line, while if power factor zero currents are being delivered to the main line they are furnished by the rotor circuit alone. If the resistances and the magnetic leakages of the rotor and stator circuits were in negligible quantities, the alternator would deliver either power factor unity currents or lagging currents to the external circuits at constant potential through variation of load. Since, however, in practice, all circuits necessarily possess resistances and have magnetic leakage, and as such properties of the circuit distort the phases of the internal currents of the machine when the machine is supplying current to the external circuit the alternator tends to maintain its electro-motive force at constant value when delivering lagging currents and to have a negative potential gradient when delivering power factor unity currents in commercial operation. The resistances I introduced into the stator circuit produce a rise of potential with an increase of lagging current delivered to the work circuit, and the inductances H in the rotor circuit bring about a positive potential gradient of the machine when delivering power factor unity currents. The rise of the potential gradient in the two cases can be varied by varying the inductances H and the resistances I so that by using the proper inductances and resistances any positive potential gradient within considerable limits can be obtained when delivering currents of any power factor. Conversely, if resistance is introduced into the rotor circuit and inductance into the stator circuit, a falling or negative potential gradient will be obtained.

The following is an explanation of the phenomena of the rising or positive potential gradient as I understand it, reference being had to the case in which inductance is added to the rotor circuit and resistance to the stator circuit. If, under these conditions, the external circuit has power factor unity current, such current flowing in the rotor inductance will develop therein an electro-motive force at right angles to the phase of the current, and consequently at right angles to the rotor terminal electro-motive force. Such current, on the other hand, in the stator circuit will develop in the resistance I an electro-motive force in phase with and in opposition to the electro-motive force of the stator. The electro-motive forces of the rotor and stator circuits will therefore be changed in value and separated in phase, the stator electro-motive force being decreased in value and the rotor electromotive force being displaced in phase. Since these two circuits are electrically connected together, they will have such a new current flowing internally through them as will produce new electro-motive forces in the stator similar in value and phase to those developed on the inductance of the rotor circuit, and as will produce new electro-motive forces in the rotor circuit similar to those developed by the resistance in the stator circuit and of such value as will again cause coincidence in phase of the terminal or resultant electro-motive forces of these two circuits. Such a current must necessarily be at right angles to the power factor unity current delivered to the line, and hence will be in phase with the original magnetizing current of the machine, but in the rotor circuit this current must flow at such a time as to produce therein an electro-motive force opposed to the rotor terminal electro-motive force, and in the stator circuit this current must flow at such a time as to produce in the resistance I an electro-motive force at right angles to the stator terminal electro-motive force, and such a current must evidently lag 90° behind these terminal electro-motive forces. The disturbances, therefore, set up by the introduced resistance and inductance result in the flow of an internal correcting or compounding current increasing the magnetization of the alternator as above described. The power factor unity currents do not directly affect the magnetization of the machine, as they flow in the stator and rotor in opposite directions at the same time, but they cause in the stator circuit a decrease in the terminal electro-motive force by flowing through the resistance of the stator circuit, and they deflect the rotor electro-motive force and the inductance electromotive force generated on the inductance coil. They therefore cut down the stator electro-motive force, and drag the two electro-motive forces out of phase. Such phase displacement necessarily causes new and additional magnetizing currents to flow in the rotor and stator internally as will again cause coincidence of phase between the two terminal electro-motive forces of these circuits, and as this correcting current is in phase with the original magnetizing current of the machine it increases its magnetization and the electro-motive force at its terminals, thus constituting in reality a compounding current flowing in the internal circuits of the machine. In a similar way it may be shown that if the alternator is called upon to deliver lagging currents to the external circuit a correcting current will flow internally within the machine which will be in phase with the original magnetizing current. It will thus be seen that the effect of introducing the inductance in the rotor circuits and the resistance in the stator circuits of this alternator causes a flow of compounding or correcting current internally through the circuits of the machine of such value in phase as to develop within the circuits electromotive forces which will cause the terminal electromotive forces of the rotor and stator to be in phase and of equal value, that is, to maintain an electrical equilibrium of these two parallel electric circuits, it further increases the total magnetizing current in the machine and therefore increases its potential. Instead of relying wholly or partially upon the compounding current flowing within the internal circuits of the machine and the variations in magnetization produced thereby, I may add supplemental compounding coils which, according to their position, will produce results similar to those produced by the inductance or the resistance.

In Fig. 2, I have shown such compounding coils in connection with the arrangement shown in Fig. 1, the resistance and inductance in this case being made variable for the purpose of adjustment. In this figure $A^2$ is the stator winding and $B^2$ is the armature, having a commutator on which bear brushes $D^2$ $E^2$ $F^2$ and $G^2$. $H^2$ $H^2$ $H^2$ $H^2$ represent variable inductances, and $I^2$ $I^2$ $I^2$ $I^2$ represent variable resistances. S is a compounding coil in series with the main connected to the brush $D^2$ through one of the inductances $H^2$, and T is a compounding coil in series with the main connected to the brush $E^2$ through an inductance $H^2$. The compounding coil S is so positioned that its field is at right angles to the brushes $D^2$ and $F^2$, while the compounding coil T is so positioned that its field is at right angles to the brushes $E^2$ and $G^2$, being displaced from the points at which the rotor circuit is connected to the stator circuit by approximately the complement of the angle of lag of the current in the work circuit. The phase of the magnetism of the coil S, since its current is of unity power factor, will coincide with the phase of magnetism of the energizing circuit which acts to produce an electromotive force upon the brushes $D^2$ and $F^2$, and the phase of magnetism of the coil T will similarly coincide in phase with the magnetism which acts automatically to produce an electromotive force on the brushes $E^2$ and $G^2$. An increase of the work current of unity power factor will therefore by reason of the coils S and T increase the magnetization of the machine, and give it a positive potential gradient. When the coils S and T are used the inductance in the rotor circuit may be wholly or partially omitted, since the compounding current which flows through the energizing circuits by reason of its presence in this instance will partially or wholly flow through the compounding coils.

In Fig. 3 a construction similar to that shown in Fig. 2 is illustrated, the difference being that the compounding coils S³ and T³ are inserted in the rotor circuit between the brushes D³ and G³ and the common joints to which the mains are connected. Since, as before stated, the rotor supplies part of the current flowing to the work circuit, it will be seen that changes in the load will produce directly a compensating action by reason of the compounding coils, and that the current which flows through these coils by reason of the presence of the inductances and resistances will, in addition to producing a compensating action independently of the compounding coils, produce a further compounding or compensating action by reason of flowing through those coils.

It will be seen from the foregoing that by the use of resistances or inductances, or both, as described, the work current is caused to set up additional multiphase magnetizing forces which result in producing the desired potential gradient, and that the same method, broadly speaking, of securing the desired potential gradient is carried out by the use of the separate windings which also set up an additional magnetization bringing about the same end. In one case an extra current is in the original energizing circuit, producing a resultant current causing an increased magnetization, while in the other case an additional magnetization is produced directly, which, combining with the original magnetization, produces a resultant magnetization, accomplishing the same result as was produced by the magnetization set up by the resultant current.

Various forms of machines and types of windings can be used to carry out my invention, the forms chosen being the preferred forms for my present purpose and the simplest for explanation.

What I claim is:—

1. In a dynamo electric machine energized by alternating currents, the combination of stator windings and rotor windings, connections between said windings whereby alternating exciting currents flow in series through them, a work circuit to which said windings are connected and to which both of said windings deliver work currents in multiple arc and means for automatically varying the exciting currents in accordance with the work currents to modify the total magnetization of the machine so as to produce the desired potential gradient.

2. In a dynamo electric machine the combination of rotor windings and stator windings connections between said windings whereby alternating exciting currents flow in series through them, a common work circuit to which said windings are connected in multiple arc and to which both of said windings deliver work currents and means for causing said work currents to vary the total magnetization of the machine so as to produce the desired potential gradient.

3. A dynamo electric machine having in combination rotor windings and stator windings connected together and connected in multiple arc to a common work circuit, said windings being each traversed by exciting and work currents, and means for causing said work currents to so automatically vary the magnetization of the machine as to produce a rising potential upon an increase in the load of unity power factor.

4. A dynamo electric machine having in combination rotor windings and stator windings connected together and connected in multiple arc to a common work circuit, said windings being each traversed by alternating exciting and work currents, and means for causing said work currents to so automatically vary the magnetization of the machine as to produce a rising potential upon an increase in the load of zero power factor.

5. A dynamo electric machine having rotor and stator windings connected together and to a common work circuit so that said rotor and stator windings are each traversed by alternating work and exciting currents and an inductance connected between said rotor windings and the common work circuit.

6. A dynamo electric machine having rotor and stator windings connected together and to a common work circuit so that said rotor and stator windings are each traversed by alternating work and exciting currents, and a resistance connected between said stator windings and the common work circuit.

7. A dynamo electric machine having rotor and stator windings, connections between the same, a common work circuit connected to said connections, said rotor and stator windings being each traversed by both work and exciting alternating currents, an inductance in series with said connections and located between said rotor windings and said common work circuit, and a resistance in series with said connections and located between said stator windings and said common work circuit.

8. A dynamo electric machine having a rotor circuit and a stator circuit connected together and to a common work circuit, a compounding coil traversed by currents flowing through said work circuit and displaced from the point of connection of said work circuit to said rotor circuit by approximately the complement of the angle of lag of the current in said work circuit, and an inductance between said rotor circuit and the point of connection of said work circuit.

9. A dynamo electric machine having a rotor circuit and a stator circuit connected together and to a common work circuit, a compounding coil traversed by currents flowing through said work circuit and displaced from the point of connection of said work circuit to said rotor circuit by approximately the complement of the angle of lag of the current in said work circuit, and a resistance connected between said stator circuit and the point of connection between said stator circuit and the point of connection of said work circuit.

10. In a dynamo electric machine, the combination of a work circuit, stator and rotor windings, a commutator connected to the rotor windings, brushes bearing on said commutator, connections between said brushes and said stator windings and to said work circuit such as to cause both exciting and work currents of alternating character to traverse each of said windings, and resistances located in series with said connections and between said stator workings and the work circuit.

11. In a dynamo electric machine, the combination of a work circuit, stator and rotor windings, a commutator connected to the rotor windings, brushes bearing on said commutator, connections between said brushes and said stator windings and to said work circuit such as to cause both exciting and work currents of alternating character to traverse each of said windings, and inductances located in series with said connections and between said rotor windings and the work circuit.

12. In a dynamo electric machine, the combination of a work circuit, stator and rotor windings, a commutator connected to the rotor windings, brushes bearing on said commutator, connections between said brushes and said stator windings and to said work circuit such as to cause both exciting and work currents of alternating character to traverse each of said windings, resistances located in series with said connections and between said stator windings and the work circuit, and inductances located in said connections and between said rotor windings and the work circuit.

13. The method of producing a desired potential gradient which consists in inducing alternating currents and establishing thereby a dissymmetrical inducing field, inducing thereby work currents and causing the said work currents to react so as to cause said field to vary in accordance with the desired change in potential.

14. The method of producing a desired potential gradient which consists in producing by means of alternating currents flowing in stator and rotor circuits a stator field and a rotor field which are dissymmetrical relatively to one another inducing magnetizing and work currents thereby and causing the current supplied to the work circuit to vary the magnetism of the rotating stator field so as to produce the desired potential gradient.

15. The method of producing a desired potential gradient which consists in producing by means of alternating currents flowing in stator and rotor circuits a stator field and a rotor field which are dissymmetrical relatively to one another inducing magnetizing and work currents thereby; and causing the current supplied to the work circuit to flow through the rotor and the stator circuits and vary the currents therein in such a manner as to vary the magnetization of the machine in accordance with the desired potential gradient.

Signed at Great Barrington, Mass. this 8th day of May 1905.

WILLIAM STANLEY.

Witnesses:
HERBERT M. SMITH,
E. FACCIOL